(12) United States Patent
Bageshwar et al.

(10) Patent No.: US 11,175,142 B2
(45) Date of Patent: *Nov. 16, 2021

(54) UPDATING INTENSITIES IN A PHD FILTER BASED ON A SENSOR TRACK ID

(71) Applicant: Honeywell International Inc., Morristown, NJ (US)

(72) Inventors: Vibhor L. Bageshwar, Minneapolis, MN (US); Michael Ray Elgersma, Plymouth, MN (US); Eric A. Euteneuer, St. Anthony Village, MN (US)

(73) Assignee: Honeywell International Inc., Charlotte, NC (US)

( * ) Notice: Subject to any disclaimer, the term of this patent is extended or adjusted under 35 U.S.C. 154(b) by 532 days.

This patent is subject to a terminal disclaimer.

(21) Appl. No.: 14/448,803

(22) Filed: Jul. 31, 2014

(65) Prior Publication Data

US 2016/0033281 A1 Feb. 4, 2016

(51) Int. Cl.
*G01C 21/20* (2006.01)
*G01S 13/86* (2006.01)
(Continued)

(52) U.S. Cl.
CPC .............. *G01C 21/20* (2013.01); *G01D 9/30* (2013.01); *G01D 9/32* (2013.01); *G01S 13/726* (2013.01);
(Continued)

(58) Field of Classification Search
CPC ...................................................... G01C 21/20
(Continued)

(56) References Cited

U.S. PATENT DOCUMENTS 4,816,833 A 3/1989 Ferguson et al.
5,390,133 A 2/1995 Sohie
(Continued)

FOREIGN PATENT DOCUMENTS

CN 101894381 A 11/2010
CN 102064783 A 5/2011
(Continued)

OTHER PUBLICATIONS

Q. Lam and et al., "Probability Hypothesis Density Filter Based Design Concept: A Survey for Space Traffic Modeling and Control", Jun. 19-21, 2012, Infotech@Aerospace 20, Garden Grove, California.*

(Continued)

*Primary Examiner* — Douglas Kay
(74) *Attorney, Agent, or Firm* — Fogg & Powers LLC (57) ABSTRACT

In one embodiment, a method of tracking multiple objects with a probabilistic hypothesis density filter is provided. The method includes obtaining measurements corresponding to a first object with at least one sensor, the at least one sensor providing one or more first track IDs for the measurements. A $T_{k+1}$ first predicted intensity is generated for the first object based on a $T_k$ first track intensity. A $T_{k+1}$ measurement from a first sensor of the at least one sensors is obtained, the first sensor providing a second track ID for the $T_{k+1}$ measurement. The second track ID is compared to the one or more first track IDs, and the $T_{k+1}$ first predicted intensity is selectively updated with the $T_{k+1}$ measurement based on whether the second track ID matches any of the one or more first track IDs to generate a $T_{k+1}$ first measurement-to-track intensity for the first object.

17 Claims, 3 Drawing Sheets

(51) Int. Cl.
G01S 13/72 (2006.01)
G01S 13/933 (2020.01)
G01D 9/30 (2006.01)
G01D 9/32 (2006.01)

(52) U.S. Cl.
CPC .......... *G01S 13/86* (2013.01); *G01S 13/865* (2013.01); *G01S 13/867* (2013.01); *G01S 13/933* (2020.01)

(58) Field of Classification Search
USPC ...................................................... 702/153
See application file for complete search history.

(56) References Cited

U.S. PATENT DOCUMENTS

| | | | |
|---|---|---|---|
| 5,414,643 A | 5/1995 | Blackman et al. | |
| 5,767,793 A | 6/1998 | Agravante et al. | |
| 5,798,942 A | 8/1998 | Danchick et al. | |
| 6,295,367 B1 | 9/2001 | Crabtree et al. | |
| 6,806,828 B1* | 10/2004 | Sparrow | G01S 11/10 342/127 |
| 6,967,616 B2 | 11/2005 | Etnyre | |
| 7,218,270 B1 | 5/2007 | Tamburino | |
| 7,256,729 B2 | 8/2007 | Bummerstede | |
| 7,626,535 B2 | 12/2009 | Ding et al. | |
| 7,782,256 B2 | 8/2010 | Smith | |
| 7,864,096 B2 | 1/2011 | Stayton et al. | |
| 7,965,867 B2* | 6/2011 | Lanz | G06K 9/00369 382/103 |
| 8,264,379 B2* | 9/2012 | Whitlow | G01C 23/00 340/945 |
| 8,378,881 B2 | 2/2013 | LeMire et al. | |
| 8,400,619 B1* | 3/2013 | Bachrach | G01C 1/04 356/4.01 |
| 8,515,881 B2 | 8/2013 | Schwoegler et al. | |
| 8,731,829 B2* | 5/2014 | Moriguchi | G06Q 10/063 114 701/422 |
| 8,886,394 B2* | 11/2014 | Noonan | G01S 7/003 701/23 |
| 9,851,437 B2* | 12/2017 | Bageshwar | G01S 13/66 |
| 10,078,903 B2* | 9/2018 | Maltese | G06T 7/277 |
| 10,309,784 B2* | 6/2019 | Bageshwar | G01B 21/16 |
| 10,605,607 B2 | 3/2020 | Bageshwar et al. | |
| 2003/0042303 A1* | 3/2003 | Tsikos | G06K 7/10594 235/384 |
| 2003/0093187 A1* | 5/2003 | Walker | B64C 13/20 701/1 |
| 2004/0027257 A1* | 2/2004 | Yannone | G01S 11/04 340/945 |
| 2004/0027274 A1 | 2/2004 | Driessen et al. | |
| 2004/0156467 A1* | 8/2004 | Freifeld | A63H 18/005 377/100 |
| 2004/0189521 A1 | 9/2004 | Smith et al. | |
| 2006/0008119 A1* | 1/2006 | Chang | G06K 9/00208 382/103 |
| 2008/0031492 A1* | 2/2008 | Lanz | G06K 9/00369 382/103 |
| 2008/0111730 A1* | 5/2008 | Ding | G01S 13/726 342/90 |
| 2008/0255911 A1* | 10/2008 | Khosla | G01S 5/0294 705/7.38 |
| 2009/0115654 A1 | 5/2009 | Lo et al. | |
| 2009/0212994 A1 | 8/2009 | Hamza et al. | |
| 2010/0231418 A1 | 9/2010 | Whitlow et al. | |
| 2012/0206300 A1 | 8/2012 | Allam et al. | |
| 2012/0221273 A1 | 8/2012 | Furukawa | |
| 2012/0233098 A1 | 9/2012 | Schwoegler et al. | |
| 2012/0277948 A1* | 11/2012 | Noonan | G01S 7/003 701/23 |
| 2013/0006577 A1* | 1/2013 | Mathews | G01S 13/726 702/150 |
| 2013/0054142 A1* | 2/2013 | Moriguchi | G06Q 10/06 701/519 |
| 2013/0085661 A1 | 4/2013 | Chan et al. | |
| 2013/0229298 A1 | 9/2013 | Eckstein et al. | |
| 2014/0055460 A1 | 2/2014 | Furukawa | |
| 2015/0055821 A1 | 2/2015 | Fotland | |
| 2015/0070347 A1* | 3/2015 | Hofmann | G06K 9/00208 345/419 |
| 2015/0308851 A1* | 10/2015 | Morikawa | G01C 21/3415 701/533 |
| 2016/0162738 A1* | 6/2016 | Miyano | G06T 7/277 348/143 |
| 2016/0350938 A1* | 12/2016 | Maltese | G06K 9/00 |

FOREIGN PATENT DOCUMENTS

| | | | |
|---|---|---|---|
| CN | 103310115 A | | 9/2013 |
| CN | 103345577 A | * | 10/2013 |
| CN | 103390262 A | | 11/2013 |
| CN | 103679753 A | | 3/2014 |
| CN | 103729637 A | | 4/2014 |
| CN | 103902819 A | | 7/2014 |
| EP | 1533628 | | 5/2005 |
| EP | 2228626 A2 | | 9/2010 |
| WO | 2014011288 | | 1/2014 |

OTHER PUBLICATIONS

D. E. Clark, "Multiple Target Tracking with the Probability Hypothesis Density Filter", Oct. 2006, Ph.D. Thesis, Heriot-Watt University.*

D. G. Danu and et al., "Assignment-Based Particle Labeling for PHD Particle Filter", 2009, Signal and Data Processing of Small Targets 2009, edited by Oliver E. Drummond, Richard D. Teichgraeber, Proc. of SPIE vol. 7445, 74450D.*

Z. Zou and et al., "Radio frequency identification enabled wireless sensing for intelligent food logistics", May 5, 2014, Published by the Royal Society. Phil. Trans. R. Soc. A 372: 20130313. http://dx.doi.org/10.1098/rsta.2013.0313.*

Blasch and et al., "Identifying moving HRR signatures with an ATR belief data association filter", proceedings of SPIE, Event: AeroSense 2000, 2000, Orlando, FL, United States, p. 478-488.*

N. N. Okello and et al., "Tracker:Tracker: a sensor fusion simulator for generalised tracking ", 1999 Information, Decision and Control. Data and Information Fusion Symposium, Signal Processing and Communications Symposium (Year: 1999).*

Panta et el (K. Panta and et al, "Probability Hypothesis Density filter versus Multiple Hypothesis Tracking", Defense and Security, 2004, Orlando, Florida, United States, Signal Processing, Sensor Fusion, and Target Recognition XIII, edited by Ivan Kadar, Proceedings of SPIE vol. 5429) (Year: 2004).*

K. Panta and et al., "Data Association and Track Management for the Gaussian Mixture Probability Hypothesis Density Filter", IEEE Transactions on Aerospace and Electronic Systems vol. 45, No. Jul. 3, 2009 (Year: 2009).*

T.M. Wood, "Simplified Multitarget Tracking Using the PHD Filter for Microscopic Video Data", IEEE Transactions on Circuits and Systems for video technology, vol. 22, No. 5, May 2012 (Year: 2012).*

European Patent Office, "Extended European Search Report from EP Application No. 15177590.5 dated Dec. 22, 2015", from foreign counterpart of U.S. Appl. No. 14/448,803, dated Dec. 22, 2015, pp. 1-8, Published in: EP.

Chen et al., "Multi-Sensor Data Integration for Autonomous Sense and Avoid", Mar. 29-31, 2011, pp. 1-14, Publisher: American Institute of Aeronautics and Astronautics, Published in: St. Louis, Missouri.

Fasano et al., "Multi-Sensor Data fusion: A Tool to Enable UAS Integration into Civil Airspace", "30th Digital Avionics Systems Conference", Oct. 16-20, 2011, pp. 1-28, Published in: Seattle, WA.

Jovanoska et al., "Multiple target tracking by a distributed UWB sensor network based on the PHD filter", "2012 15th International Conference on Information Fusion", Jul. 9-12, 2012, pp. 1095-1102, Publisher: IEEE, Published in: DE.

(56) References Cited

OTHER PUBLICATIONS

Mahler, "Multitarget Bayes Filtering via First-Order Multitarget Moments", "IEEE Transactions on Aerospace and Electronic Systems", Oct. 2003, pp. 1152-1178, vol. 39, No. 4, Publisher: IEEE.
Panta et al., "Data Association and Track Management for the Gaussian Mixture Probability Hypothesis Density Filter", "IEEE Transactions on Aerospace and Electronics Systems", Jul. 2009, pp. 1003-1016, vol. 45, No. 3, Publisher: IEEE.
Vo et al., "Tha Gaussian Mixture Probability Hypothesis Density Filter", "IEEE Transactions Signal Processing", Nov. 2006, pp. 4091-4104, vol. 54, No. 11, Publisher: IEEE.
European Patent Office, "Extended European Search Report from EP Application No. 15177589.7 dated Dec. 17, 2015", from Foreign Counterpart of U.S. Appl. No. 14/448,808, dated Dec. 17, 2015, pp. 1-10, Published in: EP.
United States Patent and Trademark Office, "Final Office Action for U.S. Appl. No. 14/448,808", dated Jan. 5, 2018, pp. 1-16, Published in: US.
United States Patent and Trademark Office, "Office Action", From U.S. Appl. No. 14/448,808, dated Jul. 3, 2017, pp. 1-22, Published in: US.
European Patent Office, "Extended European Search Report from EP Application No. 15176942.9 dated Jan. 4, 2016", from Foreign Counterpart of U.S. Appl. No. 14/448,813, dated Jan. 4, 2016, pp. 1-8, Published in: EP.
United States Patent and Trademark Office, "Advisory Action", From U.S. Appl. No. 14/448,813, dated Mar. 9, 2017, pp. 1-4, Published in: US.
United States Patent and Trademark Office, "Final Office Action", From U.S. Appl. No. 14/448,813, dated Dec. 21, 2016, pp. 1-11, Published in: US.
United States Patent and Trademark Office, "Notice of Allowance", From U.S. Appl. No. 14/448,813, dated Aug. 22, 2017, pp. 1-8, Published in: US.
United States Patent and Trademark Office, "Office Action", From U.S. Appl. No. 14/448,813, dated Aug. 19, 2016, pp. 1-17, Published in: US.
United States Patent and Trademark Office, "Office Action", From U.S. Appl. No. 14/448,813, dated Apr. 26, 2017, pp. 1-10, Published in: US.
European Patent Office, "Communication under Rule 71(3) EPC", Foreign Counterpart to U.S. Appl. No. 14/448,819, dated Mar. 22, 2017, pp. 1-21, Published in: EP.
European Patent Office, "Extended European Search Report from EP Application No. 15177585.5 dated Dec. 21, 2015", from Foreign Counterpart of U.S. Appl. No. 14/448,819, dated Dec. 21, 2015, pp. 1-9, Published in: EP.
European Patent Office, "Office Action for EP Patent Application No. 15177585.5-1812", from Foreign Counterpart of U.S. Appl. No. 14/448,819, dated Jul. 27, 2016, pp. 1-5, Published in: EP.
United States Patent and Trademark Office, "Advisory Action", From U.S. Appl. No. 14/448,819, dated Dec. 8, 2017, pp. 1-5, Published in: US.
United States Patent and Trademark Office, "Final Office Action", From U.S. Appl. No. 14/448,819, dated Aug. 25, 2017, pp. 1-27, Published in: US.
United States Patent and Trademark Office, "Office Action", From U.S. Appl. No. 14/448,819, dated Feb. 24, 2017, pp. 1-41, Published in: US.
Asseo, "Integration of Active and Passive Track Files From Internetted Aircraft for Enhanced Situation Awareness", May 23, 1988, pp. 242-250.
Clark et al., "Convergence Analysis of the Gaussian Mixture PHD Filter", IEEE Transactions on Signal Processing, Mar. 19, 2007, pp. 1-8, vol. 55, No. 4.
Clark, "Multiple Target Tracking with the Probability Hypothesis Density Filter", Ph.D. Thesis, Dept. of EECE, Heriot-Watt University, Oct. 2006, pp. 1-211.

Pace et. al., "Comparison of Implementations of Gaussian Mixture PHD Filters", 2010 13th Conference on Information Fusion (Fusion), Jul. 26-29, 2010, pp. 1-11, Publisher: IEEE.
Panta et al., "Novel Data Association Schemes for the Probability Hypothesis Density Filter", IEEE Transactions on Aerospace and Electronics Systems, Apr. 1, 2007, pp. 556-570, vol. 43, No. 2.
Wang, "Outlier Detection Over Sliding Windows for Probabilistic Data Streams", Journal of Computer Science and Technology, May 2010, pp. 389-400, vol. 25, No. (3).
U.S. Patent and Trademark Office, "Advisory Action for U.S. Appl. No. 14/448,808", dated Apr. 16, 2018, pp. 1-6, Published in: US.
U.S. Patent and Trademark Office, "Office Action for U.S. Appl. No. 14/448,808", dated May 17, 2018, pp. 1-15, Published in: US.
Sate of Israel Patent Office, Notice of Defects in Patent Application No. 240076, dated May 18, 2018, Foreign Counterpart to U.S. Appl. No. 14/448,808, pp. 1-12, Published in: IL.
Sate of Israel Patent Office, Notice of Defects in Patent Application No. 240077, dated May 28, 2018, Foreign Counterpart to U.S. Appl. No. 14/448,803, pp. 1-15, Published in: IL.
United States Patent and Trademark Office, "Office Action for U.S. Appl. No. 14/448,819", dated Nov. 29, 2018, pp. 1-55, Published in: US.
United States Patent and Trademark Office, "Final Office Action for U.S. Appl. No. 14/448,808", dated Nov. 1, 2018, pp. 1-13, Published in: US.
National Intellectual Property Administration, P.R. China, "First Office Action from CN 201510628780.9 dated Feb. 28, 2019", from Foreign Counterpart to U.S. Appl. No. 14/448,813, pp. 1-13, Published: CN.
European Patent Office, "Communication pursuant to Article 94(3) from EP Application No. 15177589.7 dated Apr. 1, 2019", from Foreign Counterpart to U.S. Appl. No. 14/448,808, pp. 1-6, Published: EP.
Hebing, "Probability Hypothesis Density Filter Algorithm and its Applications in Multi-Targets Tracking", A Dissertation for the Degree of Doctor of Engineering, Apr. 2010, pp. 1-117, Harbin Engineering University.
Israel Patent Office Ministry of Justice, "Office Action from IL Application No. 093110021.000 dated Apr. 15, 2019", from Foreign Counterpart to U.S. Appl. No. 14/448,803, pp. 1-3, Published: IL.
National Intellectual Property Administration, P.R. China, "First Office Action from CN Application No. 2015010560799.4 dated Feb. 2, 2019", from Foreign Counterpart to U.S. Appl. No. 14/448,808, pp. 1-20, Published: CN.
Xue-Bin et al., "The Gaussian Mixture Probability Hypothesis Density Filter and Its Application to Multi-Target Tracking", Chinese Journal of Computers, Feb. 2012, pp. 1-10, vol. 35, No. 2.
European Patent Office, "Communication Pursuant to Article 94(3) from EP Application No. 15177590.5", Foreign Counterpart to U.S. Appl. No. 14/448,803, dated Oct. 15, 2018, pp. 1-4, Published in: EP.
Israel Patent Office Ministry of Justice, "Office Action", from Foreign Counterpart of U.S. Appl. No. 14/448/808, dated Sep. 2, 2017, pp. 1-2, Published in: IL.
Israel Patent Office Ministry of Justice, "Office Action", from Foreign Counterpart of U.S. Appl. No. 14/448,819, dated Oct. 31, 2018, pp. 1-5, Published in: IL.
Israel Patent Office Ministry of Justice, "Office Action from IL Patent Application No. 240074", from Foreign Counterpart of U.S. Appl. No. 14/448,819, dated Mar. 11, 2019, pp. 1-5, Published in: IL.
United States Patent and Trademark Office, "Notice of Allowance" from U.S. Appl. No. 14/448,808, dated Jan. 23, 2019, pp. 1-9, Published: US.
United States Patent and Trademark Office, "Advisory Action" from U.S. Appl. No. 14/448,819, dated Dec. 26, 2017, pp. 1-5.
National Intellectual Property Office, P.R. China, "First Office Action from CN Application No. 201510594941.7 dated Mar. 27, 2019", from Foreign Counterpart to U.S. Appl. No. 14/448,803, pp. 1-14, Published: CN.
U.S. Patent and Trademark Office, "Notice of Allowance", U.S. Appl. No. 14/448,819, dated Nov. 27, 2019, pp. 1-14, Published: US.

(56) References Cited

OTHER PUBLICATIONS

Bo, "Research on the Technology for Multi-target Tracking Based on Random Finite Set", A Dissertation Submitted for the Degree of Master, 2013, pp. 1-124, South China University of Technology.
Clark et al., "Convergence Analysis of the Gaussian Mixture", IEEE Transactions on Signal Processing, Mar. 19, 2007, pp. 1204-1212, IEEE.
National Intellectual Property Administration, P.R. China, "First Office Action from CN Application No. 201510564395.2 dated Jul. 3, 2019", from Foreign Counterpart to U.S. Appl. No. 14/448,819, pp. 1-14, Published: CN.
National Intellectual Property Administration, P.R. China, "Second Office Action from CN Application No. 201510628780.9 dated Jul. 11, 2019", from Foreign Counterpart to U.S. Appl. No. 14/448,813, pp. 1-8, Published: CN.
Pace, "Comparison of Implementations of Gaussuan Mixture PHD Filters", 13th International Conference on Information Fusion, Jul. 2010, pp. 1-8, IEEE.
U.S. Patent and Trademark Office, "Notice of Allowance", U.S. Appl. No. 14/448,819, dated Aug. 28, 2019, pp. 1-9, Published: US.
U.S. Patent and Trademark Office, "Final Office Action", U.S. Appl. No. 14/448,819, dated Jun. 17, 2019, pp. 1-35, Published: US.
National Intellectual Property Administration, P.R. China, "Notification to Grant Patent Right for Invention from CN Application No. 201510594941.7", from Foreign Counterpart to U.S. Appl. No. 14/448,803, dated Oct. 24, 2019, pp. 1-7, Published: CN.
Israel Patent Office, "Office Action from IL Application No. 240075", from Foreign Counterpart to U.S. Appl. No. 14/448,819, dated Nov. 26, 2019, pp. 1-4, Published: IL.
European Patent Office, "Communication pursuant to Article 94(3) from EP Application No. 15177590.5", from Foreign Counterpart to U.S. Appl. No. 14/448,803, dated Mar. 20, 2020, pp. 1 through 4, Published: EP.
Intellectual Property India, "Office Action from IN Application No. 2323/DEL/2015", from Foreign Counterpart to U.S. Appl. No. 14/448,803, dated Dec. 30, 2020, pp. 1 through 6, Published: IN.
Intellectual Property India, "Office Action from IN Application No. 2222/DEL/2015", from Foreign Counterpart to U.S. Appl. No. 14/448,813, dated Mar. 25, 2021, pp. 1 through 5, Published: IN.

\* cited by examiner

UPDATING INTENSITIES IN A PHD FILTER BASED ON A SENSOR TRACK ID

CROSS-REFERENCE TO RELATED APPLICATIONS

This application is related to the following United States patent applications, which are hereby incorporated herein by reference:

U.S. patent application Ser. No. 14/448,808, published as US 2016/0033276, entitled "MERGING INTENSITIES IN A PHD FILTER BASED ON A SENSOR TRACK ID" filed on even date herewith;

U.S. patent application Ser. No. 14/448,813, published as US 2016/0033633, entitled "ADJUSTING WEIGHT OF INTENSITY IN A PHD FILTER BASED ON SENSOR TRACK ID" filed on even date herewith; and U.S. patent application Ser. No. 14/448,819, published as US 2016/0033282, entitled "TWO STEP PRUNING IN A PHD FILTER" filed on even date herewith.

BACKGROUND

The objective of see-and-avoid or sense-and-avoid (SAA) is to provide an unmanned aircraft system (UAS) with the capability to perform self-separation and collision avoidance against all air traffic, with or without active, transponder based collision avoidance systems. SAA requires the UAS to detect and track intruder aircraft in the operating vicinity of the ownship aircraft to identify guidance maneuvers required to perform self-separation and collision avoidance. The detect and track functions are key enablers for UAS SAA capability because the UAS cannot perform self-separation or collision avoidance maneuvers for undetected, untracked intruder aircraft. The detect function refers to using surveillance sensors to measure the position of intruder aircraft relative to the ownship UAS. The track function refers to fusing the surveillance sensor measurements together to estimate the trajectory statistics (also referred to herein as the track) of the intruder aircraft relative to the ownship UAS. The surveillance sensors provide measurements with corresponding measurement IDs that can be correlated across time or random across time.

The track function estimates the tracks of the intruder aircraft using a data association algorithm to assign measurements to a current track, a filter to fuse sensor measurements with the current estimates of the track statistics, and a trajectory manager that oversees the sensor fusion operation, initiates tracks, maintains tracks, and deletes tracks.

One tracking system uses random finite sets (RFS) to track multiple intruder aircraft (IA) for UAS SAA, with the RFS being an implementation of a multi-hypothesis testing (MHT) approach. RFS casts the multiple IA tracking problem into a set-valued state space where the statistics of the set-valued state vector and set-valued measurement vector are approximated using their first-order moments (also referred to herein as an intensity), and applied in a Bayesian filter framework to estimate the IA track statistics using Gaussian mixtures. The resulting filter is referred to as a probabilistic hypothesis density (PHD) filter. An intensity refers to a weight, a state mean vector, and a state covariance matrix of an element of the set-valued state space where this element corresponds to the statistics of a track.

SUMMARY

In one embodiment, a method of tracking multiple objects with a probabilistic hypothesis density filter is provided. The method includes obtaining a plurality of measurements corresponding to a first object with at least one sensor, the at least one sensor providing one or more first track IDs for the plurality of measurements. A $T_k$ first track intensity is generated for the first object based on the plurality of measurements, the $T_k$ first track intensity including a weight, a state mean vector, and a state covariance matrix of statistics of a track of the first object at time $T_{k+1}$. A $T_k$ first predicted intensity is then generated for the first object based on the $T_k$ first track intensity, the $T_{k+1}$ first predicted intensity corresponding to time $T_{k+1}$. A $T_{k+1}$ measurement from a first sensor of the at least one sensors is obtained, the first sensor providing a second track ID for the $T_{k+1}$ measurement, wherein the $T_{k+1}$ measurement corresponds to time $T_{k+1}$. The second track ID is compared to the one or more first track IDs, and the $T_{k+1}$ first predicted intensity is selectively updated with the statistics of a $T_{k+1}$ measurement vector based on whether the second track ID matches any of the one or more first track IDs to generate a $T_{k+1}$ first measurement-to-track intensity for the first object at time $T_{k+1}$.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

The subject matter described herein provides for a method of updating intensities that are being tracked in a probabilistic hypothesis density (PHD) filter by using track identifiers (IDs) provided by one or more sensors obtaining object measurements corresponding to the intensities. A track ID is an identifier provided by a sensor, wherein the identifier is correlated across time to a series of measurements. One type of track ID is an international civil aviation organization (ICAO) aircraft address that is transmitted by an aircraft along with corresponding measurement information and is received by a sensor along with the corresponding measurement information. Examples of sensors that are able to receive such ICAO aircraft addresses include an automatic dependent surveillance-broadcast (ADS-B) sensor and a traffic collision avoidance system (TCAS) mode S sensor. Another type of track ID is an identifier from a sensor that correlates measurements over time. In particular, such sensors identify tracks of objects by correlating measurements over time and assigning an ID to those tracks. These IDs are provided by the sensor along with the measurements. Since these IDs are generated by a sensor that correlates its own measurements over time, these IDs are sensor specific. That is, even though a first sensor and a second sensor may be obtaining measurements of the same object, the first sensor and second sensor correlate their own measurements, not the measurements of the other sensor; therefore, the track ID provided by each sensor is different and corresponds to the measurements from that sensor not the other sensor. Examples of a sensor that provides such a track ID for correlated measurements include a TCAS mode C sensor, certain LiDARs, and certain radars. The subject matter described herein utilizes these track IDs to improve the accuracy and efficiency with which multiple objects can be tracked in a PHD filter.

Figure 1:
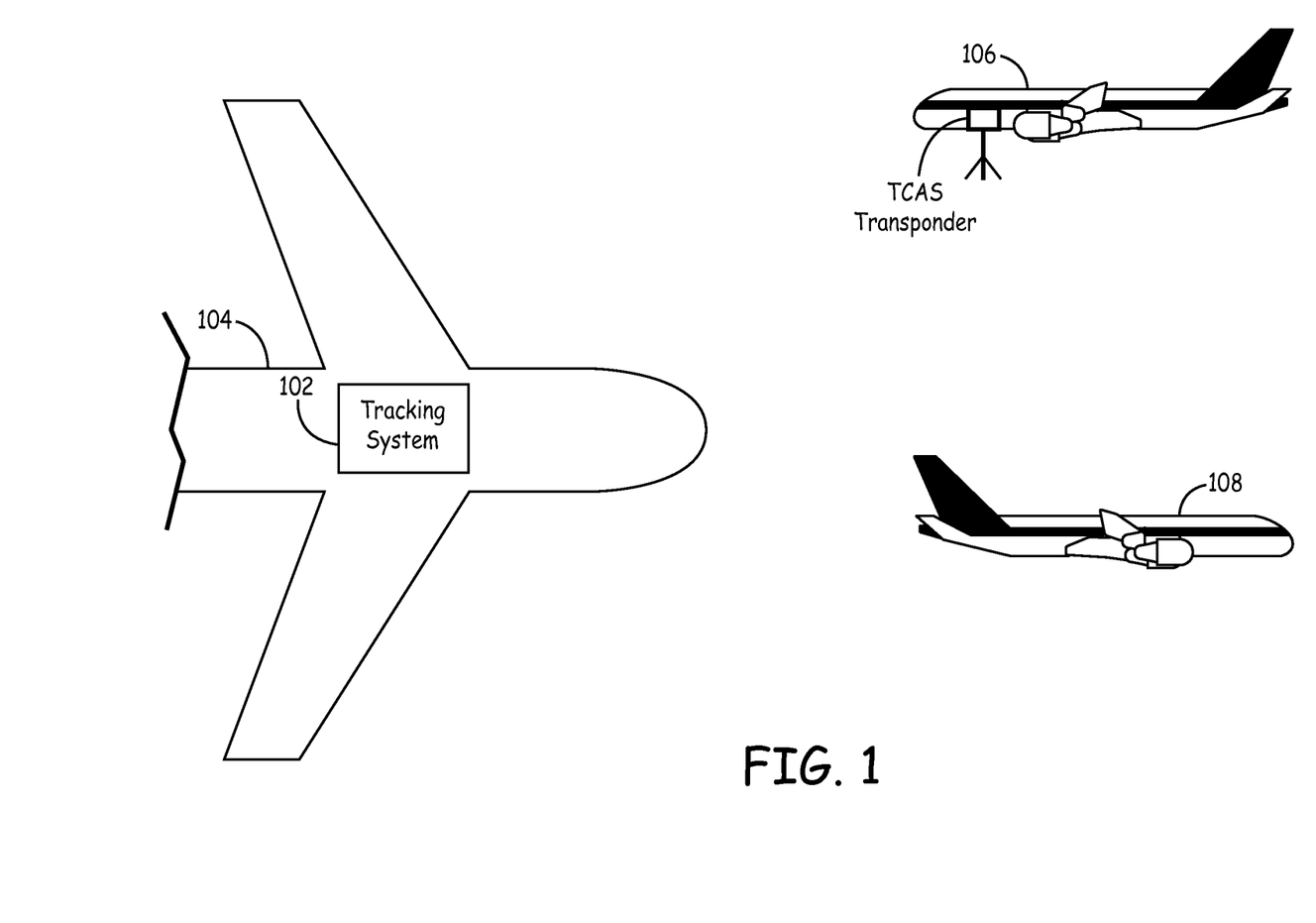
FIG. 1 is a block diagram of an example environment in which a PHD filter based tracking system may be used.

FIG. 1 is a block diagram of an example environment in which a PHD filter based tracking system 102 may be used. In the example shown herein, the tracking system 102 is installed within an aircraft 104, however, the tracking system 102 can be installed within any vehicle or can be a standalone system. The tracking system 102 is configured to detect and track other objects in the environment. In this example, the tracking system 102 is configured to detect objects in the air such as intruder aircraft (IA) 106, 108. In an example, the tracking system 102 is part of a sense-and-avoid (SAA) system and the aircraft 104 is an unmanned aircraft system (UAS).

Figure 2:
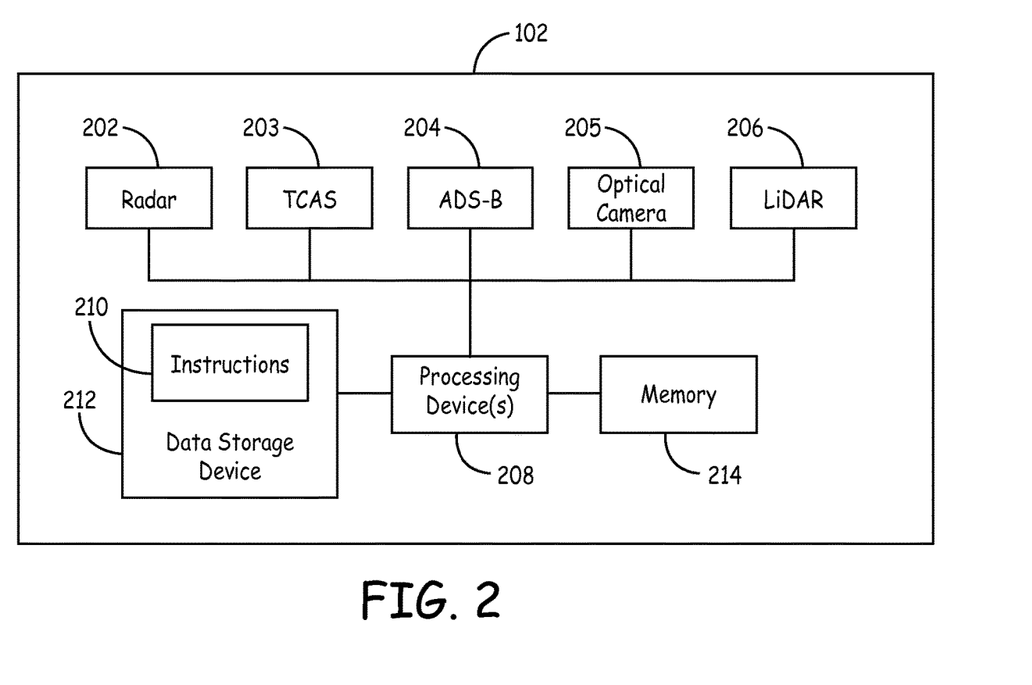
FIG. 2 is a block diagram of an example tracking system used in the environment of FIG. 1.

FIG. 2 is a block diagram of an example tracking system 102. The tracking system 102 includes a plurality of sensors 202-206 configured to detect objects in the environment around the sensors 202-206. The plurality of sensors 202-206 can include any suitable sensor such as a radar 202, TCAS sensor 203, ADS-B sensor 204, optical camera 205, and a LiDAR 206. Other sensors may be used as well. Additionally, any number of sensors including multiple of the same type of sensors may be used. The sensors 202-206 are coupled to one or more processing devices 208. The sensors 202-206 are configured to obtain measurements and send the measurements to the one or more processing devices 208. As mentioned above, some or all of the sensors 202-206 can be configured to send a track ID along with a measurement to the one or more processing devices 208.

The one or more processing devices 208 are configured to track a plurality of objects (such as intruder aircraft 106, 108) based on the measurements received from the sensors 202-206. To track the objects, the one or more processing devices 208 are configured to execute instructions 210 stored on one or more data storage devices 212 coupled to the one or more processing devices 208. The instructions 210, when executed by the one or more processing devices 208, cause the one or more processing devices 208 to implement the actions to track objects based on the measurements from the sensors 202-206. The one or more processing devices 208 can include a central processing unit (CPU), microcontroller, microprocessor, (e.g., a digital signal processor), field programmable gate array (FPGA), application specific integrated circuit (ASIC), or other processing device. In certain examples, the one or more data storage devices 212 include a non-volatile electronic hardware device for storing machine readable data and instructions. In an example, the one or more data storage devices 212 store information on any appropriate computer readable medium used for storage of computer readable instructions or data structures. The computer readable medium can be implemented as any available media that can be accessed by the one or more processing devices 208. Suitable computer readable media may include storage media such as magnetic or optical media. For example, storage media can include a conventional hard disk, Compact Disk-Read Only Memory (CD-ROM), solid state drive (SSD), other flash memory, Read Only Memory (ROM), and Electrically Erasable Programmable ROM (EEPROM). The one or more processing devices 208 are also coupled to memory 214 that is configured to store data and instructions during execution by the one or more processing devices 208. The memory 214 can include volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), and Static RAM (SRAM), etc.). In an example, the one or more processing devices 208 are configured to output information regarding the tracks of the objects to an output device such as a display device. In some examples, the one or more processing devices 208 provide the track information to a larger SAA system for controlling movement of an unmanned aircraft system.

Figure 3:
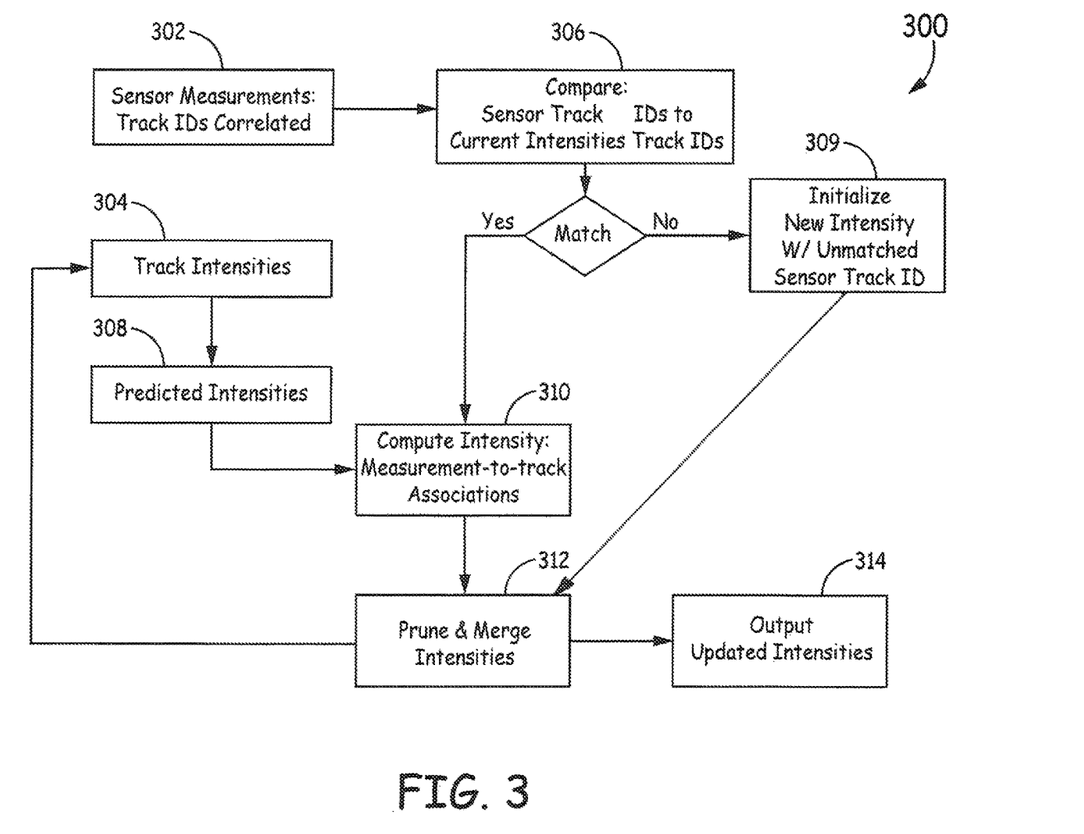
FIG. 3 is a flow diagram of an example method for tracking a plurality of objects with the tracking system of FIG. 2.

FIG. 3 is a flow diagram of an example method 300 for tracking a plurality of objects with the tracking system 102. The tracking system 102 implements a loop that computes a plurality of intensities and updates the intensities during each loop based on newly obtained measurements from the sensors 202-206. The loop operates in real time to track a plurality of objects that are measured by the sensors 202-206. As discussed above, the loop implements a probabilistic hypothesis density (PHD) filter to update the intensities. The PHD filter loop attempts to maintain a single intensity for each object being tracked. In the case of a tracking system 102 for an aircraft 104, the PHD filter loop attempts to maintain a single intensity for each intruder aircraft 106, 108, and/or other airborne object within a field-of-view of a sensor 202-206. During a given loop, one or more intensities are maintained corresponding to the number of objects being tracked at that time. Each iteration through the loop updates each intensity being maintained to the next time step unless the particular intensity is deleted (no longer tracked).

The tracking method 300 operates on measurements that have a track ID associated therewith that was provided by a sensor 202-206. Accordingly, one or more measurements and their associated track IDs are provided by the sensors 202-206 (block 302). The one or more measurements each have a single respective track ID associated therewith. In some examples, other measurements that do not have a track ID associated therewith are also obtained by the sensors 202-206. These other measurements can also be used to update intensities maintained by the loop of method 300 after translating the measurements to the statistics of a set-valued measurement vector (i.e., the measurement statistics, for short). Actions to update the intensities with such other measurements are not shown in FIG. 3.

The tracking method 300 utilizes the track IDs provided by the sensors 202-206 to determine whether to update a currently maintained intensity with a newly obtained measurement from the sensors 202-206. The tracking method 300 utilizes the fact that the track ID provided by a sensor 202-206 indicates a potential correlation with previous measurements to determine which intensities to update with which measurement statistics. In order to do this, the tracking method 300 associates one or more track IDs with a currently maintained intensity. In some examples, all currently maintained intensities have at least one track ID associated therewith, however, in other examples one or more of the currently maintained intensities may not have a track ID associated therewith. In any case, the intensities that do have a track ID associated therewith can proceed through the method 300 as described herein. Any intensity that does not have a track ID associated therewith can be updated in any suitable manner including in a manner known to those skilled in the art. Actions to update an intensity that does not have a track ID associated therewith are not shown in FIG. 3.

As mentioned above, each loop of method 300 updates each intensity that is not deleted to the next time step. As used herein, time steps are referred to as $T_k$, $T_{k+1}$ for the time step which immediately follows time step $T_k$, $T_{k+2}$ for the time step which immediately follows time step $T_{k+1}$, etc. The length of time corresponding to a time step can be determined in any suitable manner, such as based on the frequency of measurements provided by one or more of the sensors 202-206. For a given loop of the method 300, the one or more measurements provided by the sensors 202-206 correspond to the time step at which the one or more intensities are being updated. In an example loop, therefore, the one or more intensities input into the loop (block 304) correspond to time step $T_k$ and the one or more measurements input into the loop (block 302) correspond to time step $T_{k+1}$. During this iteration of the loop, the one or more intensities are predicted to time step $T_{k+1}$ (block 308) and updated to time step $T_{k+1}$ using the one or more measurements that correspond to time step $T_{k+1}$.

In an example, one or more $T_k$ intensities (intensities corresponding to time step $T_k$) are provided (block 304) from the previous iteration of the loop. The one or more $T_k$ intensities are the one or more intensities that were output from the previous iteration of the loop. In examples where the tracking system 102 provides tracks of objects to an SAA system, the one or more $T_k$ intensities are output to the SAA system as the tracks for time step $T_k$. Each intensity progresses through multiple intermediate stages during updating by method 300. An intensity that has completed updating for a given time step and is output (e.g., to an SAA system) is referred to herein as a "track intensity". Accordingly, the one or more $T_k$ intensities input into a loop of method 300 are also referred to herein as one or more $T_k$ "track" intensities.

Ignoring any $T_k$ track intensities that do not have a track ID associated therewith (as discussed above), each of the one or more $T_k$ track intensities input into the loop has a respective one or more track IDs associated therewith. Each of these track IDs corresponds to one or more measurements from a sensor 202-206 that have been used to update (in a previous time step) the respective $T_k$ track intensity. The one or more track IDs can correspond to measurements that have been used to update the $T_k$ track intensity at any time step including and previous to the $T_k$ time step. For example, the respective one or more track IDs can correspond to measurements that have been used to update the corresponding $T_k$ track intensity at the $T_k$ time step, the $T_{k-1}$ time step, the $T_{k-2}$ time step, etc. More detail regarding the process of associating one or more track IDs with a track intensity is provided below.

In any case, the one or more $T_k$ track intensities (block 304) collectively have a first one or more track IDs associated therewith. Similarly, the one or more measurements (block 302) from the sensors 202-206 collectively have a second one or more track IDs provided therewith. The second one or more track IDs are compared with the first one or more track IDs to determine which, if any, $T_k$ track intensities to update with which, if any, of the one or more measurement statistics. In an example, to compare the second one or more track IDs with the first one or more track IDs, each track ID from the second one or more track IDs is compared with each track ID from the one or more first track IDs. A match occurs when a track ID from the second one or more track IDs is the same as a track ID from the first one or more track IDs. The one or more $T_k$ track intensities are selectively updated based on whether any of the second one or more track IDs match the one or more track IDs of the first one or more track IDs that are associated with a respective $T_k$ track intensity. That is, a given $T_k$ track intensity is selectively updated based on whether any of the second one or more track IDs match any of the one or more track IDs associated with the given $T_k$ track intensity.

In addition to using the comparison between the one or more track IDs to determine whether to update the one or more $T_k$ track intensities, a statistical distance test is also used. The statistical distance test includes computing a statistical distance between an intensity and a measurement statistic. Any suitable distance test can be used, such as a Malhanobis distance test. Since the one or more measurement statistics correspond to time step $T_{k+1}$, in order to accurately compute a statistical distance, a predicted intensity for time step $T_{k+1}$ (a $T_{k+1}$ predicted intensity) is computed (block 308) for each of the one or more $T_{k+1}$ track intensities. These one or more $T_{k+1}$ predicted intensities can be computed in any suitable manner including in ways known to those skilled in the art. Once the $T_{k+1}$ predicted intensities are computed, statistical distances can be computed between the one or more $T_{k+1}$ predicted intensities and the one or more measurement statistics respectively. The $T_{k+1}$ predicted intensities are then selectively updated based on whether a corresponding statistical distance (as explained below) is below a threshold. The threshold can be selected in any suitable manner.

In an example, a statistical distance is computed for each pair of the one or more measurement statistics and the $T_{k+1}$ predicted intensities. That is, a statistical distance is computed between each of the one or more measurements measurement statistics and each of the one or more $T_{k+1}$ predicted intensities. If any of the measurement-$T_{k+1}$ predicted intensity pairs have at least one matching track ID and have a statistical distance that is below a threshold, that $T_{k+1}$ predicted intensity is updated with the paired measurement statistic. If there is no matching track ID or the statistical distance is above the threshold for a given measurement-$T_{k+1}$ predicted intensity pair, then that $T_{k+1}$ predicted intensity is not updated with the paired measurement statistic. This analysis is repeated for each measurement-$T_{k+1}$ predicted intensity pair.

In another example, instead of computing the statistical distance for each pair of the one or more measurement statistics and the $T_{k+1}$ predicted intensities, a statistical distance test is selectively computed based on whether any matching track IDs are present for the measurement-$T_{k+1}$ predicted intensity pair. For example, for a given measurement-$T_{k+1}$ predicted intensity pair, if the track ID provided with that measurement statistic matches any of the track IDs associated with the $T_{k+1}$ predicted intensity, then the statistical distance between that measurement statistic and that $T_{k+1}$ predicted intensity are computed. If the statistical distance is below a threshold, that $T_{k+1}$ predicted intensity is updated with the paired measurement statistic. If the statistical distance is above the threshold, then that $T_{k+1}$ predicted intensity is not updated with the paired measurement statistic. If, however, the track ID provided with the sensor measurement does not match any of track IDs associated with the $T_{k+1}$ predicted intensity, then the statistical distance is not computed and that $T_{k+1}$ predicted intensity is not updated with the paired measurement statistic. This analysis is repeated for each measurement-$T_{k+1}$ predicted intensity pair.

In either case, the one or more $T_{k+1}$ predicted intensities are selectively updated with the one or more measurement statistics based on their track IDs and the statistical distances. Updating a $T_{k+1}$ predicted intensity with a measurement statistic (block 310) refers to the process of adjusting the prediction to take into account the measurement statistic. Basically, the analysis of the track IDs and the statistical distance identifies which measurement statistics likely correspond to which $T_{k+1}$ predicted intensities. Since track IDs provide evidence of a correlation between a previous sensor measurement and a current sensor measurement, the track IDs can be used as a simple and effective aid in determining whether a given measurement statistic corresponds to an object being tracked by a given $T_{k+1}$ predicted intensity.

In an example, this updating includes computing a measurement-to-track association between the paired measurement statistic and $T_{k+1}$ predicted intensity to generate a measurement-to-track intensity for the measurement-$T_{k+1}$ predicted intensity pair. Such a measurement-to-track association can be computed in any suitable manner, including in ways known to those skilled in the art. The measurement-to-track intensity corresponds to time step $T_{k+1}$ and, therefore, is also referred to as a $T_{k+1}$ measurement-to-track intensity. In this example, measurement-to-track intensities are generated for each measurement-$T_{k+1}$ predicted intensity pair that has a matching track ID and a statistical distance below the threshold.

In addition to being used to selectively determine whether to update a $T_{k+1}$ predicted intensity, track IDs can also be used to determine whether to initiate a new intensity (block 309). In an example, if a track ID in the second one or more track IDs (provided with the one or more sensor measurements) does not match any of the first one or more track IDs (associated with the one or more $T_k$ track intensities), then a new intensity is initiated having values equal to the measurement statistic provided with the (non-matching) track ID. Since the track IDs provide evidence of a correlation between previous sensor measurements and a current sensor measurement, if no current intensities ($T_k$ track intensities) have a track ID that matches a track ID of a sensor measurement, this provides evidence that the sensor measurement corresponding to that track ID is a measurement of a newly sensed object by a given sensor. Accordingly, a new intensity is created for that sensor measurement. Such a newly sensed object can be an object that just came into view of the sensor or can occur when a sensor drops an object for a while—for whatever reason—and then picks up the object again. In any case, a new intensity is created for each measurement of the one or more sensor measurements in which the track ID provided therewith does not match any of the first one or more track IDs. The track ID from the sensor measurement used to create the new intensity is associated with that new intensity.

In an example, these one or more new intensities are analyzed in the same manner as the one or more $T_{k+1}$ predicted intensities to determine whether to update the one or more new intensities based on whether each new intensity-measurement pair has a matching track ID and a statistical distance below a threshold (block 310). In this example, since each new intensity has values equal to a measurement statistic and has the track ID from that measurement statistic associated therewith, each new intensity will have one measurement statistic that has a matching track ID and a statistical distance below the threshold. Similar to that described above, updating a new intensity includes computing a measurement-to-track association to generate a measurement-to-track intensity based on the new intensity-measurement pair.

The $T_{k+1}$ predicted intensities, new intensities, and measurement-to-track intensities are then further processed by pruning and merging the intensities to generate the $T_{k+1}$ track intensities for this loop (block 312). Any suitable process of pruning and merging intensities can be used, including processes known to those skilled in the art.

The resulting one or more $T_{k+1}$ track intensities can be output for display and/or further analysis, such as by an SAA system (block 314). The one or more $T_{k+1}$ track intensities are also provided as input into the next iteration of the loop for updating based on one or more measurement statistics for time step $T_{k+2}$.

As mentioned above, in order to utilize track IDs to determine whether to update a track intensity and a new intensity one or more track IDs are associated with the one or more track intensities and one or more new intensities. The one or more track IDs associated with a track intensity correspond to measurement statistics used to update/generate the track intensity. For a new intensity, the track ID associated therewith is the track ID provided with the sensor measurement from which the new intensity was created as discussed above. For a measurement-to-track intensity, the track ID associated therewith is the track ID from the measurement statistic of the one or more measurement statistics in the current time step that was used to update the predicted intensity to generate the measurement-to-track intensity.

For a track intensity, the track intensity maintains all track IDs from any measurement used to create the track intensity. For example, if no intensities are merged with a given track intensity as it is updated to the next time step, the updated track intensity maintains the same track ID(s) as the previous track intensity. If, however, a first intensity is merged (block 312) with a second one or more intensities to create an updated track intensity, the updated track intensity has associated therewith all the track IDs from the first intensity and the second one or more intensities. The first intensity and second one or more intensities can be any type of intensity including a predicted intensity, a measurement-to-track intensity, and a new intensity. Accordingly, if a predicted intensity and a measurement-to-track intensity are merged to form a track intensity, that track intensity has associated therewith all the track ID(s) associated with the predicted intensity and the track ID associated with the measurement-to-track intensity.

If an intensity is pruned (block 312), that intensity is deleted (no longer maintained) and, therefore, is not present in the updated track intensities. Any track IDs associated with a pruned intensity are not passed on to an updated track intensity by the pruned intensity. Finally, if a measurement-to-track intensity is not merged with any other intensities and an updated track intensity is created based on the measurement-to-track intensity, the track ID associated with the measurement-to-track intensity is associated with the updated track intensity. No other track IDs are associated with such an updated track intensity. Similarly, if a new intensity is not merged with any other intensities and an updated track intensity is created based thereon, the track ID associated with the new intensity is associated with the updated track intensity. No other track IDs are associated with such an updated track intensity.

EXAMPLE EMBODIMENTS

Example 1 includes a method of tracking multiple objects with a probabilistic hypothesis density filter, the method comprising: obtaining a plurality of measurements corresponding to a first object with at least one sensor, the at least one sensor providing one or more first track IDs for the plurality of measurements; generating a $T_k$ first track intensity for the first object based on the plurality of measurements, the $T_k$ first track intensity including a weight, a state mean vector, and a state covariance matrix of statistics of a track of the first object at time $T_k$; generating a $T_{k+1}$ first predicted intensity for the first object based on the $T_k$ first track intensity, the $T_{k+1}$ first predicted intensity corresponding to time $T_{k+1}$; obtaining a $T_{k+1}$ measurement from a first sensor of the at least one sensors, the first sensor providing a second track ID for the $T_{k+1}$ measurement, wherein the $T_{k+1}$ measurement corresponds to time $T_{k+1}$; comparing the second track ID to the one or more first track IDs; and selectively updating the $T_{k+1}$ first predicted intensity with the $T_{k+1}$ measurement based on whether the second track ID matches any of the one or more first track IDs to generate a $T_{k+1}$ first measurement-to-track intensity for the first object at time $T_{k+1}$.

Example 2 includes the method of Example 1, comprising: computing a statistical distance between the $T_{k+1}$ first predicted intensity and the $T_{k+1}$ measurement; and wherein selectively updating includes selectively updating the $T_{k+1}$ first predicted intensity with the $T_{k+1}$ measurement based on whether the statistical distance is less than a threshold.

Example 3 includes the method of Example 2, wherein selectively updating includes: if the second track ID matches any of the one or more first track IDs and the statistical distance is less than a threshold, updating the $T_{k+1}$ first predicted intensity with the $T_{k+1}$ measurement; and if either the second track ID does not match any of the one or more first track IDs or the statistical distance is greater than the threshold, not updating the $T_{k+1}$ first predicted intensity with the $T_{k+1}$ measurement.

Example 4 includes the method of any of Examples 1-3, comprising: generating a plurality of $T_k$ track intensities including the $T_k$ first track intensity, the plurality of $T_k$ track intensities having a plurality of track IDs associated therewith, the plurality of track IDs including the first one or more track IDs, if the second track ID does not match any of the plurality of track IDs, generating a new intensity having values equal to the $T_{k+1}$ measurement.

Example 5 includes the method of Example 4, comprising: generating a $T_{k+1}$ second track intensity for a second object based on the new intensity, the $T_{k+1}$ second track intensity corresponding to time $T_{k+1}$; generating a $T_{k+2}$ second predicted intensity based on the $T_{k+1}$ second track intensity, the $T_{k+2}$ second predicted intensity corresponding to time $T_{k+2}$; associating the second track ID with the $T_{k+2}$ second predicted intensity; obtaining a $T_{k+2}$ measurement from the first sensor, the first sensor providing a third track ID for the $T_{k+2}$ measurement, wherein the $T_{k+2}$ measurement corresponds to time $T_{k+2}$; comparing the third track ID to the second track ID; computing a second statistical distance between the $T_{k+2}$ second predicted intensity and the $T_{k+2}$ measurement; selectively updating the $T_{k+2}$ second predicted intensity with the $T_{k+2}$ measurement based on whether the third track ID matches the second track ID and based on whether the second statistical distance is less than the threshold to generate a $T_{k+2}$ second measurement-to-track intensity for the second object at time $T_{k+2}$.

Example 6 includes the method of any of Examples 1-5, comprising: generating a $T_{k+1}$ first track intensity based on the $T_{k+1}$ first measurement-to-track intensity; associating the one or more first track IDs with the $T_{k+1}$ first track intensity; generating a $T_{k+2}$ first predicted intensity for the first object based on the $T_{k+1}$ first track intensity, the $T_{k+2}$ first predicted intensity corresponding to time $T_{k+2}$; obtaining a $T_{k+2}$ measurement from the first sensor, the first sensor providing a fourth track ID for the $T_{k+2}$ measurement, wherein the $T_{k+2}$ measurement corresponds to time $T_{k+2}$; comparing the fourth track ID to the one or more first track IDs; and selectively updating the $T_{k+2}$ first predicted intensity with the $T_{k+2}$ measurement based on whether the fourth track ID matches any of the one or more first track IDs to generate a $T_{k+2}$ first track intensity for the first object at time $T_{k+2}$.

Example 7 includes the method of any of Examples 1-6, wherein selectively updating includes: computing a statistical distance between the $T_{k+1}$ first predicted intensity and the $T_{k+1}$ measurement, wherein selectively updating includes, if the second track ID matches any of the one or more first track IDs and the statistical distance is less than a threshold: updating the $T_{k+1}$ first predicted intensity with the $T_{k+1}$ measurement to generate a $T_{k+1}$ first measurement-to-track intensity; and associating only the second track ID of the one or more first track IDs with the $T_{k+1}$ first measurement-to-track intensity; pruning the $T_{k+1}$ first predicted intensity such that the $T_{k+1}$ first predicted intensity is no longer used for tracking the first object; and generating a $T_{k+1}$ track intensity from the $T_{k+1}$ first measurement-to-track intensity; and associating only the second track ID of the one or more first track IDs with the $T_{k+1}$ track intensity.

Example 8 includes the method of any of Examples 1-7, wherein each track ID of the one or more first track IDs and the second track ID is one of an identifier assigned by a sensor to a set of measurements obtained by that sensor that are correlated across time, or an international civil aviation organization (ICAO) aircraft address received by a sensor and corresponding to a respective measurement for that sensor.

Example 9 includes a tracking system comprising: one or more processing devices; and one or more data storage devices including instructions which, when executed by the one or more processing devices, cause the one or more processing devices to track multiple objects with a probabilistic hypothesis density filter, wherein the instructions cause the one or more processing devices to: obtain a plurality of measurements corresponding to a first object with at least one sensor, the at least one sensor providing one or more first track IDs for the plurality of measurements; generate a $T_k$ first track intensity for the first object based on the plurality of measurements, the $T_k$ first track intensity including a weight, a state mean vector, and a state covariance matrix of statistics of a track of the first object at time $T_k$; generate a $T_{k+1}$ first predicted intensity for the first object based on the $T_k$ first track intensity, the $T_{k+1}$ first predicted intensity corresponding to time $T_{k+1}$; obtain a $T_{k+1}$ measurement from a first sensor of the at least one sensors, the first sensor providing a second track ID for the $T_{k+1}$ measurement, wherein the $T_{k+1}$ measurement corresponds to time $T_{k+1}$; compare the second track ID to the one or more first track IDs; and selectively update the $T_{k-1}$ first predicted intensity with the $T_{k+1}$ measurement based on whether the second track ID matches any of the one or more first track IDs to generate a $T_{k+1}$ first measurement-to-track intensity for the first object at time $T_{k+1}$.

Example 10 includes the tracking system of Example 9, wherein the instructions cause the one or more processing devices to: compute a statistical distance between the $T_{k+1}$ first predicted intensity and the $T_{k+1}$ measurement; and wherein selectively update includes selectively update the $T_{k+1}$ first predicted intensity with the $T_{k+1}$ measurement based on whether the statistical distance is less than a threshold.

Example 11 includes the tracking system of Example 10, wherein selectively update includes: if the second track ID matches any of the one or more first track IDs and the statistical distance is less than a threshold, update the $T_{k+1}$ first predicted intensity with the $T_{k+1}$ measurement; and if either the second track ID does not match any of the one or more first track IDs or the statistical distance is greater than the threshold, not updating the $T_{k+1}$ first predicted intensity with the $T_{k+1}$ measurement.

Example 12 includes the tracking system of any of Examples 9-11, wherein the instructions cause the one or more processing devices to: generate a plurality of $T_k$ track intensities including the $T_k$ first track intensity, the plurality of $T_k$ track intensities having a plurality of track IDs associated therewith, the plurality of track IDs including the first one or more track IDs, if the second track ID does not match any of the plurality of track IDs, generate a new intensity having values equal to the $T_{k+1}$ measurement.

Example 13 includes the tracking system of Example 12, wherein the instructions cause the one or more processing devices to: generate a $T_{k+1}$ second track intensity for a second object based on the new intensity, the $T_{k+1}$ second track intensity corresponding to time $T_{k+1}$; generate a $T_{k+2}$ second predicted intensity based on the $T_{k+1}$ second track intensity, the $T_{k+2}$ second predicted intensity corresponding to time $T_{k+2}$; associate the second track ID with the $T_{k+2}$ second predicted intensity; obtain a $T_{k+2}$ measurement from the first sensor, the first sensor providing a third track ID for the $T_{k+2}$ measurement, wherein the $T_{k+2}$ measurement corresponds to time $T_{k+2}$; compare the third track ID to the second track ID; compute a second statistical distance between the $T_{k+2}$ second predicted intensity and the $T_{k+2}$ measurement; selectively update the $T_{k+2}$ second predicted intensity with the $T_{k+2}$ measurement based on whether the third track ID matches the second track ID and based on whether the second statistical distance is less than the threshold to generate a $T_{k+2}$ second measurement-to-track intensity for the second object at time $T_{k+2}$.

Example 14 includes the tracking system of any of Examples 9-13, wherein the instructions cause the one or more processing devices to: generate a $T_{k+1}$ first track intensity based on the $T_{k+1}$ first measurement-to-track intensity; associate the one or more first track IDs with the $T_{k+1}$ first track intensity; generate a $T_{k+2}$ first predicted intensity for the first object based on the $T_{k+1}$ first track intensity, the $T_{k+2}$ first predicted intensity corresponding to time $T_{k+2}$; obtain a $T_{k+2}$ measurement from the first sensor, the first sensor providing a fourth track ID for the $T_{k+2}$ measurement, wherein the $T_{k+2}$ measurement corresponds to time $T_{k+2}$; compare the fourth track ID to the one or more first track IDs; and selectively update the $T_{k+2}$ first predicted intensity with the $T_{k+2}$ measurement based on whether the fourth track ID matches any of the one or more first track IDs to generate a $T_{k+2}$ first track intensity for the first object at time $T_{k+2}$.

Example 15 includes the tracking system of any of Examples 9-14, wherein selectively update includes: compute a statistical distance between the $T_{k+1}$ first predicted intensity and the $T_{k+1}$ measurement, wherein selectively update includes, if the second track ID matches any of the one or more first track IDs and the statistical distance is less than a threshold: update the $T_{k+1}$ first predicted intensity with the $T_{k+1}$ measurement to generate a $T_{k+1}$ first measurement-to-track intensity; and associate only the second track ID of the one or more first track IDs with the $T_{k+1}$ first measurement-to-track intensity; prune the $T_{k+1}$ first predicted intensity such that the $T_{k+1}$ first predicted intensity is no longer used for tracking the first object; and generate a $T_{k+1}$ track intensity from the $T_{k+1}$ first measurement-to-track intensity; and associate only the second track ID of the one or more first track IDs with the $T_{k+1}$ track intensity.

Example 16 includes the tracking system of any of Examples 9-15, wherein each track ID of the one or more first track IDs and the second track ID is one of an identifier assigned by a sensor to a set of measurements obtained by that sensor that are correlated across time, or an international civil aviation organization (ICAO) aircraft address received by a sensor and corresponding to a respective measurement for that sensor.

Example 17 includes a computer readable medium including instructions which, when executed by one or more processing devices, cause the one or more processing devices to: obtain a plurality of measurements corresponding to a first object with at least one sensor, the at least one sensor providing one or more first track IDs for the plurality of measurements; generate a $T_k$ first track intensity for the first object based on the plurality of measurements, the $T_k$ first track intensity including a weight, a state mean vector, and a state covariance matrix of statistics of a track of the first object at time $T_k$; generate a $T_{k+1}$ first predicted intensity for the first object based on the $T_k$ first track intensity, the $T_{k+1}$ first predicted intensity corresponding to time $T_{k+1}$; obtain a $T_{k+1}$ measurement from a first sensor of the at least one sensors, the first sensor providing a second track ID for the $T_{k+1}$ measurement, wherein the $T_{k+1}$ measurement corresponds to time $T_{k+1}$; compare the second track ID to the one or more first track IDs; and selectively update the $T_{k+1}$ first predicted intensity with the $T_{k+1}$ measurement based on whether the second track ID matches any of the one or more first track IDs to generate a $T_{k+1}$ first measurement-to-track intensity for the first object at time $T_{k+1}$.

Example 18 includes the computer readable medium of Example 17, wherein the instructions cause the one or more processing devices to: compute a statistical distance between the $T_{k+1}$ first predicted intensity and the $T_{k+1}$ measurement; and wherein selectively update includes selectively update the $T_{k+1}$ first predicted intensity with the $T_{k+1}$ measurement based on whether the statistical distance is less than a threshold.

Example 19 includes the computer readable medium of any of Examples 17-18, wherein the instructions cause the one or more processing devices to: generate a plurality of $T_k$ track intensities including the $T_k$ first track intensity, the plurality of $T_k$ track intensities having a plurality of track IDs associated therewith, the plurality of track IDs including the first one or more track IDs, if the second track ID does not match any of the plurality of track IDs, generate a new intensity having values equal to the $T_{k+1}$ measurement.

Example 20 includes the computer readable medium of any of Examples 17-19, wherein each track ID of the one or more first track IDs and the second track ID is one of an identifier assigned by a sensor to a set of measurements obtained by that sensor that are correlated across time, or an international civil aviation organization (ICAO) aircraft address received by a sensor and corresponding to a respective measurement for that sensor.

What is claimed is:

1. A tracking method comprising:
   tracking multiple objects in an environment around a vehicle with a probabilistic hypothesis density filter using one or more processing devices that are configured to perform a method comprising:
   obtaining statistics of a measurement vector, based on one or more sensor measurements corresponding to a first object with at least one sensor onboard the vehicle;
   obtaining, by the at least one sensor, a first track identifier (ID) for the one or more sensor measurements, wherein the first track ID is correlated across time to the one or more sensor measurements;

generating a $T_k$ first track intensity for the first object based on the statistics of the measurement vector, the $T_k$ first track intensity including a weight, a state mean vector, and a state covariance matrix of statistics of a track of the first object at time $T_k$;

generating a $T_{k+1}$ first predicted intensity for the first object based on the $T_k$ first track intensity, the $T_{k+1}$ first predicted intensity corresponding to time $T_{k+1}$;

obtaining statistics of a $T_{k+1}$ measurement vector, based on a $T_{k+1}$ sensor measurement from a first sensor of the at least one sensor, the first sensor providing a second track ID for the $T_{k+1}$ sensor measurement, wherein the $T_{k+1}$ sensor measurement corresponds to time $T_{k+1}$;

comparing the second track ID to the first track ID;

updating the $T_{k+1}$ first predicted intensity with the statistics of the $T_{k+1}$ measurement vector if the second track ID matches the first track ID to generate a $T_{k+1}$ first measurement-to-track intensity for the first object at time $T_{k+1}$;

generating a new intensity having values equal to the statistics of the $T_{k+1}$ measurement vector if the second track ID does not match the first track ID;

generating a $T_{k+1}$ second track intensity for a second object based on the new intensity, the $T_{k+1}$ second track intensity corresponding to time $T_{k+1}$;

generating a $T_{k+2}$ second predicted intensity based on the $T_{k+1}$ second track intensity, the $T_{k+2}$ second predicted intensity corresponding to time $T_{k+2}$;

associating the second track ID with the $T_{k+2}$ second predicted intensity;

obtaining statistics of a $T_{k+2}$ measurement vector, based on a $T_{k+2}$ sensor measurement from the first sensor, the first sensor providing a third track ID for the $T_{k+2}$ sensor measurement, wherein the $T_{k+2}$ sensor measurement corresponds to time $T_{k+2}$;

comparing the third track ID to the second track ID;

computing a statistical distance between the $T_{k+2}$ second predicted intensity and the statistics of the $T_{k+2}$ measurement vector; and selectively updating the $T_{k+2}$ second predicted intensity with the statistics of the $T_{k+2}$ measurement vector based on whether the third track ID matches the second track ID and based on whether the statistical distance is less than a threshold to generate a $T_{k+2}$ second measurement-to-track intensity for the second object at time $T_{k+2}$;

wherein the probabilistic hypothesis density filter is operative to maintain a single intensity for each object being tracked.

2. The method of claim 1, further comprising:
computing a statistical distance between the $T_{k+1}$ first predicted intensity and the statistics of the $T_{k+1}$ measurement vector; and
wherein updating includes updating the $T_{k+1}$ first predicted intensity with the statistics of the $T_{k+1}$ measurement vector if the statistical distance is less than a threshold.

3. The method of claim 2, wherein:
if either the second track ID does not match the first track ID or the statistical distance is greater than the threshold, not updating the $T_{k+1}$ first predicted intensity with the statistics of the $T_{k+1}$ measurement vector.

4. The method of claim 1, further comprising:
generating a $T_{k+1}$ first track intensity based on the $T_{k+1}$ first measurement-to-track intensity;
associating the first track ID with the $T_{k+1}$ first track intensity;
generating a $T_{k+2}$ first predicted intensity for the first object based on the $T_{k+1}$ first track intensity, the $T_{k+2}$ first predicted intensity corresponding to time $T_{k+2}$;
obtaining statistics of a $T_{k+2}$ measurement vector, based on a $T_{k+2}$ sensor measurement from the first sensor, the first sensor providing a fourth track ID for the $T_{k+2}$ sensor measurement, wherein the $T_{k+2}$ sensor measurement corresponds to time $T_{k+2}$;
comparing the fourth track ID to the first track ID; and
selectively updating the $T_{k+2}$ first predicted intensity with the statistics of the $T_{k+2}$ measurement vector based on whether the fourth track ID matches the first track ID to generate a $T_{k+2}$ first measurement-to-track intensity for the first object at time $T_{k+2}$.

5. The method of claim 1, wherein updating includes:
computing a statistical distance between the $T_{k+1}$ first predicted intensity and the statistics of the $T_{k+1}$ measurement vector;
if the second track ID matches the first track ID and the statistical distance is less than a threshold:
    updating the $T_{k+1}$ first predicted intensity with the statistics of the $T_{k+1}$ measurement vector to generate a $T_{k+1}$ first measurement-to-track intensity; and
    associating only the second track ID with the $T_{k+1}$ first measurement-to-track intensity;
pruning the $T_{k+1}$ first predicted intensity such that the $T_{k+1}$ first predicted intensity is no longer used for tracking the first object;
generating a $T_{k+1}$ track intensity from the $T_{k+1}$ first measurement-to-track intensity; and
associating only the second track ID with the $T_{k+1}$ track intensity.

6. The method of claim 1, wherein each track ID of the first track ID and the second track ID is one of an identifier assigned by a sensor of the at least one sensor to a set of measurements obtained by that sensor that are correlated across time, or an international civil aviation organization (ICAO) aircraft address received by a sensor of the at least one sensor and corresponding to a respective measurement for that sensor.

7. A tracking system comprising:
one or more processing devices onboard a vehicle;
a plurality of sensors onboard the vehicle and operatively coupled to the one or more processing devices; and
one or more data storage devices onboard the vehicle and including instructions which, when executed by the one or more processing devices, cause the one or more processing devices to track multiple objects in an environment around the vehicle with a probabilistic hypothesis density filter, wherein the instructions cause the one or more processing devices to:
    obtain a plurality of sensor measurements corresponding to a first object with at least one sensor onboard the vehicle;
    obtain, by the at least one sensor, a first track identifier (ID) for the plurality of sensor measurements, wherein the first track ID is correlated across time to the plurality of sensor measurements;
    generate a $T_k$ first track intensity for the first object based on measurement statistics from the plurality of sensor measurements, the $T_k$ first track intensity including a weight, a state mean vector, and a state covariance matrix of statistics of a track of the first object at time $T_k$;

generate a $T_{k+1}$ first predicted intensity for the first object based on the $T_k$ first track intensity, the $T_{k+1}$ first predicted intensity corresponding to time $T_{k+1}$;

obtain a $T_{k+1}$ sensor measurement from a first sensor of the plurality of sensors, the first sensor providing a second track ID for the $T_{k+1}$ sensor measurement, wherein the $T_{k+1}$ sensor measurement corresponds to time $T_{k+1}$;

compare the second track ID to the first track ID;

selectively update the $T_{k+1}$ first predicted intensity with $T_{k+1}$ measurement statistics from the $T_{k+1}$ sensor measurement, based on whether the second track ID matches the first track ID to generate a $T_{k+1}$ first measurement-to-track intensity for the first object at time $T_{k+1}$;

generate a $T_{k+1}$ second track intensity for a second object based on the new intensity, the $T_{k+1}$ second track intensity corresponding to time $T_{k+1}$, generate a $T_{k+2}$ second predicted intensity based on the $T_{k+1}$ second track intensity, the $T_{k+2}$ second predicted intensity corresponding to time $T_{k+2}$;

associate the second track ID with the $T_{k+2}$ second predicted intensity;

obtain a $T_{k+2}$ sensor measurement from the first sensor, the first sensor providing a third track ID for the $T_{k+2}$ sensor measurement, wherein the $T_{k+2}$ sensor measurement corresponds to time $T_{k+2}$;

compare the third track ID to the second track ID;

compute a statistical distance between the $T_{k+2}$ second predicted intensity and $T_{k+2}$ measurement statistics from the $T_{k+2}$ sensor measurement; and selectively update the $T_{k+2}$ second predicted intensity with the $T_{k+2}$ measurement statistics based on whether the third track ID matches the second track ID and based on whether the statistical distance is less than a threshold to generate a $T_{k+2}$ second measurement-to-track intensity for the second object at time $T_{k+2}$, wherein the probabilistic hypothesis density filter is operative to maintain a single intensity for each object being tracked.

8. The tracking system of claim 7, wherein the instructions cause the one or more processing devices to:

compute a statistical distance between the $T_{k+1}$ first predicted intensity and the $T_{k+1}$ measurement statistics; and wherein selectively update includes selectively update the $T_{k+1}$ first predicted intensity with the $T_{k+1}$ measurement statistics based on whether the statistical distance is less than a threshold.

9. The tracking system of claim 8, wherein:

if either the second track ID does not match the first track ID or the statistical distance is greater than the threshold, not updating the $T_{k+1}$ first predicted intensity with the $T_{k+1}$ measurement statistics.

10. The tracking system of claim 7, wherein the instructions cause the one or more processing devices to:

generate a plurality of $T_k$ track intensities including the $T_k$ first track intensity, the plurality of $T_k$ track intensities having a plurality of track IDs associated therewith, the plurality of track IDs including the first track ID; and if the second track ID does not match any of the plurality of track IDs, generate a new intensity having values equal to the $T_{k+1}$ measurement statistics.

11. The tracking system of claim 7, wherein the instructions cause the one or more processing devices to:

generate a $T_{k+1}$ first track intensity based on the $T_{k+1}$ first measurement-to-track intensity;

associate the first track ID with the $T_{k+1}$ first track intensity;

generate a $T_{k+2}$ first predicted intensity for the first object based on the $T_{k+1}$ first track intensity, the $T_{k+2}$ first predicted intensity corresponding to time $T_{k+2}$;

obtain a $T_{k+2}$ sensor measurement from the first sensor, the first sensor providing a fourth track ID for the $T_{k+2}$ sensor measurement, wherein the $T_{k+2}$ sensor measurement corresponds to time $T_{k+2}$;

compare the fourth track ID to the first track ID; and selectively update the $T_{k+2}$ first predicted intensity with $T_{k+2}$ measurement statistics from the $T_{k+2}$ sensor measurement based on whether the fourth track ID matches the first track ID to generate a $T_{k+2}$ first measurement-to-track intensity for the first object at time $T_{k+2}$.

12. The tracking system of claim 7, wherein selectively update includes:

compute a statistical distance between the $T_{k+1}$ first predicted intensity and the $T_{k+1}$ measurement statistics;

if the second track ID matches the first track ID and the statistical distance is less than a threshold:

update the $T_{k+1}$ first predicted intensity with the $T_{k+1}$ measurement statistics to generate a $T_{k+1}$ first measurement-to-track intensity; and associate only the second track ID with the $T_{k+1}$ first measurement-to-track intensity;

prune the $T_{k+1}$ first predicted intensity such that the $T_{k+1}$ first predicted intensity is no longer used for tracking the first object;

generate a $T_{k+1}$ track intensity from the $T_{k+1}$ first measurement-to-track intensity; and associate only the second track ID with the $T_{k+1}$ track intensity.

13. The tracking system of claim 7, wherein:

the vehicle is an aircraft; and the plurality of sensors comprise one or more of a radar, a traffic collision avoidance system (TCAS) sensor, an automatic dependent surveillance-broadcast (ADS-B) sensor, an optical camera, or a LiDAR;

wherein each track ID of the first track ID and the second track ID is one of an identifier assigned by one of the sensors to a set of measurements obtained by that sensor that are correlated across time, or an international civil aviation organization (ICAO) aircraft address received by one of the sensors and corresponding to a respective measurement for that sensor.

14. A non-transitory computer readable medium including instructions which, when executed by one or more processing devices, cause the one or more processing devices to:

track multiple objects in an environment around a vehicle with a probabilistic hypothesis density filter, wherein the instructions cause the one or more processing devices to:

obtain a plurality of sensor measurements corresponding to a first object with at least one sensor onboard the vehicle;

obtain, by the at least one sensor, a first track identifier (ID) for the plurality of sensor measurements, wherein the first track ID is correlated across time to the plurality of sensor measurements;

generate a $T_k$ first track intensity for the first object based on measurement statistics from the plurality of sensor measurements, the $T_k$ first track intensity including a weight, a state mean vector, and a state covariance matrix of statistics of a track of the first object at time $T_k$;

generate a $T_{k+1}$ first predicted intensity for the first object based on the $T_k$ first track intensity, the $T_{k+1}$ first predicted intensity corresponding to time $T_{k+1}$;

obtain a $T_{k+1}$ sensor measurement from a first sensor of the plurality of sensors, the first sensor providing a second track ID for the $T_{k+1}$ sensor measurement, wherein the $T_{k+1}$ sensor measurement corresponds to time $T_{k+1}$;

compare the second track ID to the first track ID;

selectively update the $T_{k+1}$ first predicted intensity with $T_{k+1}$ measurement statistics from the $T_{k+1}$ sensor measurement, based on whether the second track ID matches the first track ID to generate a $T_{k+1}$ first measurement-to-track intensity for the first object at time $T_{k+1}$;

generate a $T_{k+1}$ second track intensity for a second object based on the new intensity, the $T_{k+1}$ second track intensity corresponding to time $T_{k+1}$;

generate a $T_{k+2}$ second predicted intensity based on the $T_{k+1}$ second track intensity, the $T_{k+2}$ second predicted intensity corresponding to time $T_{k+2}$;

associate the second track ID with the $T_{k+2}$ second predicted intensity;

obtain a $T_{k+2}$ sensor measurement from the first sensor, the first sensor providing a third track ID for the $T_{k+2}$ sensor measurement, wherein the $T_{k+2}$ sensor measurement corresponds to time $T_{k+2}$;

compare the third track ID to the second track ID;

compute a statistical distance between the $T_{k+2}$ second predicted intensity and $T_{k+2}$ measurement statistics from the $T_{k+2}$ sensor measurement; and selectively update the $T_{k+2}$ second predicted intensity with the $T_{k+2}$ measurement statistics based on whether the third track ID matches the second track ID and based on whether the statistical distance is less than a threshold to generate a $T_{k+2}$ second measurement-to-track intensity for the second object at time $T_{k+2}$;

wherein the probabilistic hypothesis density filter is operative to maintain a single intensity for each object being tracked.

15. The non-transitory computer readable medium of claim 14, wherein the instructions cause the one or more processing devices to:

compute a statistical distance between the $T_{k+1}$ first predicted intensity and the $T_{k+1}$ measurement statistics; and wherein selectively update includes selectively update the $T_{k+1}$ first predicted intensity with the $T_{k+1}$ measurement statistics based on whether the statistical distance is less than a threshold.

16. The non-transitory computer readable medium of claim 14, wherein the instructions cause the one or more processing devices to:

generate a plurality of $T_k$ track intensities including the $T_k$ first track intensity, the plurality of $T_k$ track intensities having a plurality of track IDs associated therewith, the plurality of track IDs including the first track ID; and if the second track ID does not match any of the plurality of track IDs, generate a new intensity having values equal to the $T_{k+1}$ measurement statistics.

17. The non-transitory computer readable medium of claim 14, wherein each track ID of the first track ID and the second track ID is an international civil aviation organization (ICAO) aircraft address received by a sensor of the at least one sensor and corresponding to a respective measurement for that sensor.

* * * * *